(12) United States Patent
Voit et al.

(10) Patent No.: US 9,276,827 B2
(45) Date of Patent: Mar. 1, 2016

(54) ALLOCATING COMPUTING RESOURCES BASED UPON GEOGRAPHIC MOVEMENT

(71) Applicant: CISCO TECHNOLOGY, INC., San Jose, CA (US)

(72) Inventors: Eric A. Voit, San Jose, CA (US); Richard M. Pruss, San Jose, CA (US); John E. McDowall, San Jose, CA (US); Jan Medved, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 313 days.

(21) Appl. No.: 13/843,435

(22) Filed: Mar. 15, 2013

(65) Prior Publication Data

US 2014/0280898 A1   Sep. 18, 2014

(51) Int. Cl.
*H04L 12/26* (2006.01)
*H04W 4/02* (2009.01)
*H04L 29/12* (2006.01)
*H04L 29/08* (2006.01)
*H04W 64/00* (2009.01)
*H04L 12/721* (2013.01)
(Continued)

(52) U.S. Cl.
CPC ............ *H04L 43/026* (2013.01); *H04L 43/028* (2013.01); *H04L 47/70* (2013.01); *H04L 61/00* (2013.01); *H04L 67/18* (2013.01); *H04W 4/02* (2013.01); *H04W 4/028* (2013.01); *H04L 45/38* (2013.01); *H04L 45/42* (2013.01); *H04L 45/64* (2013.01); *H04L 45/70* (2013.01); *H04L 47/762* (2013.01); *H04L 47/781* (2013.01); *H04L 47/808* (2013.01); *H04L 49/30* (2013.01); *H04L 61/103* (2013.01); *H04L 61/1523* (2013.01); *H04L 61/2015* (2013.01); *H04L 67/1097* (2013.01); *H04L 67/2842* (2013.01); *H04L 67/2847* (2013.01); *H04W 40/20* (2013.01); *H04W 64/00* (2013.01)

(58) Field of Classification Search
USPC ......................................... 709/224
See application file for complete search history.

(56) References Cited

U.S. PATENT DOCUMENTS 6,188,905 B1 * 2/2001 Rudrapatna ........... H04W 28/26
                                                        455/452.2
6,490,460 B1 * 12/2002 Soliman ................ H04W 52/12
                                                         455/441
(Continued)

OTHER PUBLICATIONS

Roberto Bifulco et al: "Scalability of a mobile cloud management system", Mobile Cloud Computing, ACM, 2 Penn Plaza, Suite 701 NY NY 10121-0701 USA, Aug. 17, 2012, pp. 17-22, XP058008109, DOI: 10.1145/2342509.2342514 ISBN: 978-1-4503-1519-7, Section 1-4.*

(Continued)

*Primary Examiner* — Backhean Tiv
(74) *Attorney, Agent, or Firm* — Patterson & Sheridan, LLP (57) ABSTRACT

Embodiments described herein use APIs on network devices in a SDN enabled network to monitor the network traffic flowing through the network devices and determine an identity of the client initiating the network traffic. Specifically, the APIs provide a user application with user credentials, IP addresses, MAC addresses, and other identifying information mined from the network flows. Once the identity is found, the application may identify the client's current geographic location. The network devices may continue to monitor the network devices to identify any movement events associated with the client. In response to a movement event, the application may reallocate resources proximate to the new geographic location of the client.

20 Claims, 5 Drawing Sheets

(51) Int. Cl.
*H04L 12/717* (2013.01)
*H04L 12/927* (2013.01)
*H04L 12/923* (2013.01)
*H04L 12/911* (2013.01)
*H04L 12/935* (2013.01)
*H04W 40/20* (2009.01)
*H04L 12/715* (2013.01)

(56) References Cited

U.S. PATENT DOCUMENTS

| | | | | |
|---|---|---|---|---|
| 6,751,663 | B1* | 6/2004 | Farrell et al. | 709/224 |
| 7,020,082 | B2* | 3/2006 | Bhagavath et al. | 370/230 |
| 7,523,191 | B1* | 4/2009 | Thomas et al. | 709/224 |
| 7,688,960 | B1* | 3/2010 | Aubuchon | H04L 41/50 379/201.03 |
| 7,751,409 | B1* | 7/2010 | Carolan | H04L 41/5045 370/352 |
| 8,880,678 | B1* | 11/2014 | Colton et al. | 709/224 |
| 2003/0072433 | A1* | 4/2003 | Brown | H04Q 3/0016 379/221.14 |
| 2003/0110252 | A1* | 6/2003 | Yang-Huffman | 709/224 |
| 2005/0055322 | A1* | 3/2005 | Masters et al. | 707/1 |
| 2006/0099954 | A1* | 5/2006 | Henderson | H04L 45/00 455/447 |
| 2006/0203762 | A1* | 9/2006 | Taubenheim et al. | 370/328 |
| 2007/0039049 | A1* | 2/2007 | Kupferman et al. | 726/22 |
| 2009/0022288 | A1* | 1/2009 | Brunson et al. | 379/88.12 |
| 2010/0046579 | A1* | 2/2010 | Baker et al. | 374/152 |
| 2010/0278137 | A1* | 11/2010 | Kwon | H04J 13/0059 370/330 |
| 2011/0039579 | A1* | 2/2011 | Karjalainen | H04W 4/001 455/456.1 |
| 2011/0295655 | A1* | 12/2011 | Tsuji et al. | 705/7.38 |
| 2011/0302316 | A1* | 12/2011 | Chou | H04L 67/02 709/228 |
| 2012/0278476 | A1* | 11/2012 | Agrawal | G06Q 50/01 709/224 |
| 2012/0324468 | A1* | 12/2012 | Slater | G06F 9/52 718/104 |
| 2013/0163475 | A1* | 6/2013 | Beliveau | H04L 67/327 370/257 |
| 2013/0219067 | A1* | 8/2013 | Boss | H04L 67/306 709/226 |
| 2014/0073338 | A1* | 3/2014 | Lioulis | H04W 72/04 455/452.1 |
| 2014/0112190 | A1* | 4/2014 | Chou | H04L 41/0213 370/254 |
| 2014/0126410 | A1* | 5/2014 | Agarwal | H04W 24/02 370/252 |
| 2014/0146664 | A1* | 5/2014 | Amante | H04L 45/50 370/228 |
| 2014/0280874 | A1* | 9/2014 | Bosworth et al. | 709/224 |
| 2014/0280887 | A1* | 9/2014 | Kjendal et al. | 709/224 |
| 2014/0280889 | A1* | 9/2014 | Nispel et al. | 709/224 |
| 2014/0280898 | A1* | 9/2014 | Voit | H04L 61/00 709/224 |
| 2015/0201228 | A1* | 7/2015 | Hasek | H04N 7/17318 725/28 |

OTHER PUBLICATIONS

Roberto Bifulco et al: "Scalability of a mobile cloud management system", Mobile Cloud Computing, ACM, 2 Penn Plaza, Suite 701, New York, NY 10121-0701 USA, Aug. 17, 2012, pp. 17-22.

Matthew Broadbent et al: "OpenCache", Conext Student Workshop, ACM, 2 Penn Plaza, Suite 701, New York, NY, 10121-0701 USA, Dec. 10, 2012, pp. 15-16.

International Search Report for PCT/US2014/022431, Jun. 13, 2014.

* cited by examiner

ALLOCATING COMPUTING RESOURCES BASED UPON GEOGRAPHIC MOVEMENT

TECHNICAL FIELD

Embodiments presented in this disclosure generally relate to monitoring the geographic movements of a client, and more specifically, to reallocating client resources based on the geographic movements.

BACKGROUND

A content delivery network or content distribution network (CDN) is typically a large distributed system of servers deployed in multiple data centers in the Internet. The goal of a CDN is to serve content to end-users with high availability and high performance. CDNs serve a large fraction of the Internet content today, including web objects (text, graphics, URLs and scripts), downloadable objects (media files, software, documents), applications (e-commerce, portals), live streaming media, on-demand streaming media, and social networks.

Often, a CDN caches data based on the perceived location of the client device making the request. The CDN may use, for example, the IP address of the computing device making a request for content to estimate a geographic location of the computing device. The CDN may then cache additional data at a location in the network that is in close proximity to the location. However, CDNs are typically ambivalent towards the particular client or client device requesting the content. Stated differently, CDNs do not typically attempt to identify what client, as distinguished from other clients, is requesting data. Moreover, the CDNs only attempt to cache data close to a requesting entity after receiving a request for data—i.e., typical CDNs have no knowledge of client identity. Accordingly, CDNs are not customizable to suit the needs of a particular client or able to react to a client changing location until that client requests content from the CDN.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION

Overview

Embodiments of the present disclosure include a method for determining a first geographic location of the client and monitoring one or more network flows traversing an ingress port of at least one network device in a software-defined networking (SDN) enabled network to determine identification data associated with the client. The method includes associating the client ID to the network flow containing the identification data and determining, based on the network flow, a second geographic location of the client, wherein the first and second geographic locations are different. The method includes allocating computing resources associated with the client ID in response to the client moving from the first geographic location to the second geographic location.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DESCRIPTION OF EXAMPLE EMBODIMENTS

Software-defined networking (SDN) is an approach to networking in which control is decoupled from hardware and given to a software application, referred to herein as a SDN controller. When a packet arrives at a network device in a non-SDN enabled network, the control plane managed by proprietary firmware in a switch, determines where to forward the packet. In some network devices, the control plane may be configured to recognize different types of packets and treat them differently, such as forwarding the packets to different network devices or dropping the packets if certain criteria are met.

In an SDN enabled network, a network administrator can change how the network devices route data packets using the software application without having to, for example, send a technician to the individual network devices. The administrator can remotely reconfigure the rules in the control plane of the network devices—e.g., prioritizing, de-prioritizing or even blocking specific types of packets—using the SDN controller. A SDN enabled network may allow the administrator to manage traffic loads in a flexible and more efficient manner relative to conventional network devices that use control planes based on firmware. Moreover, SDN allows a network administrator to configure a switching fabric across multi-vendor hardware systems that may use different proprietary firmware.

SDN, in general, provides additional flexibility relative to conventional networks. Using an SDN controller, which may be either centrally located or located on the respective network devices, a network administrator can configure the control plane and dictate how the network device routes data. For example, the network administrator may assign criteria or rules that, when satisfied, instruct the network device to perform a specific action on the received packet—e.g., drop the packet, forward the packet to a particular network device, evaluate the packet using an application on the network device, and the like. In one embodiment, the SDN controller configures the routing table or forwarding table (i.e., forwarding information base) in a network device based on the network administrator's preferences.

In one embodiment, the flexibility of SDN may be used to track the geographic movements of a client and reallocate resources based on these movements. Because the control planes of the network devices in a SDN enabled network are accessible (or exposed) to remote applications, an application may monitor the network traffic flowing through the network devices to determine an identity of the client initiating the network traffic. For example, the application may use one or more application programming interfaces (API) in the network devices that provide client credentials, IP addresses, MAC addresses, and other identifying information that can be associated with network flows. Once a client identify is found, the application may determine the client's current geographic location.

The network devices may continue to monitor network flow to detect any movement events such as the client disconnecting from a network device (e.g., turning off a computing device), timing out of a wireless connection, connecting to a different network device, and the like. Upon detecting the movement event, the application may reallocate resources based on the new geographic location of the client. For example, the application may cache data at a storage element in close proximity to the client, start-up resources for the client at a local server, log the client into a computing device at the new location, and the like. Accordingly, in contrast to typical CDNs that reallocate resources after a client requests data, the application can reallocate resources by monitoring the client's movements.

Because the application assigns a client ID based on a client's traits or attributes (e.g., a username, job title, type of data the client generates, etc.), the application can track a client even if that client switches between different computing devices, e.g., a desktop computer and a mobile phone. For example, the network devices in the SDN may inform the application that the client has left work (e.g., the client is no longer sending data traffic to an edge device using her desktop computer). However, another network router may identify the client when the client's mobile phone initiates a wireless connection. The application can then reallocate resources associated with the client base on her new location. Accordingly, the application may track a client based on a client ID rather than tracking a particular device.

In one embodiment, the application may predict a geographic location of the client based on one or more movement events. The application may develop historical patterns, which are triggered based on the movement events. For example, a client may make monthly trips from New York to California. Based on the client logging into a network device at the airport, the application may predict the client's ultimate destination (e.g., California) and reallocate resources accordingly.

Figure 1:
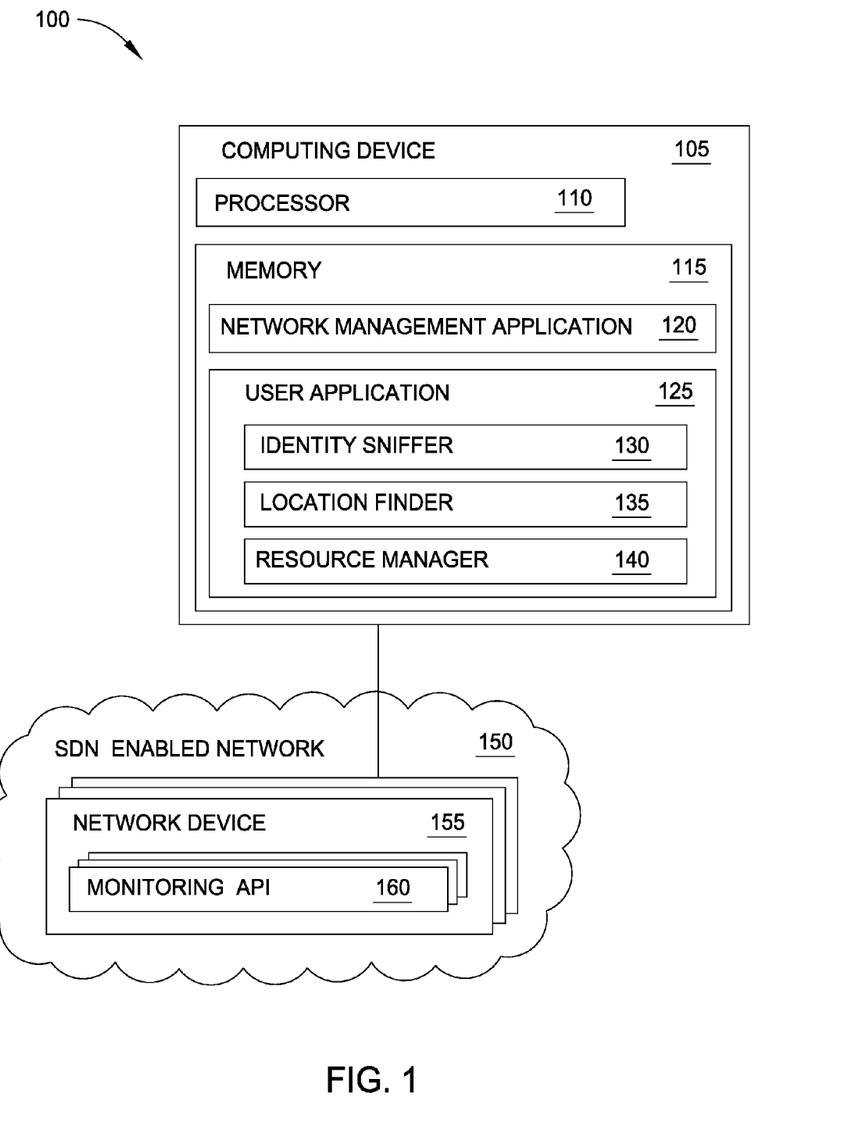
FIG. 1 illustrates a system that includes a computing device coupled to a software-defined networking enabled network, according to one embodiment disclosed herein.

FIG. 1 illustrates a system 100 that includes a computing device 105 coupled to a SDN enabled network 150, according to one embodiment. The computing device 105 includes a processor 110 and a memory 115. The processor 110 may be implemented using one or more processors that may include any number of processing cores. Moreover, processors 110 may be implemented using any processor design that is capable of performing the functions described herein. Memory 115 may include volatile or non-volatile memory elements such as RAM, Flash memory, internal or external hard drives, EPROMs and the like. In some embodiments, memory 115 may include external memory elements communicatively coupled to computing device 105.

As shown, memory 115 includes a network management application 120 and a user application 125. In one embodiment, the network management application 120 is an abstraction tool that permits a programmer or network administrator to access and monitor different functions and outputs of network devices 155 in the SDN enabled network 150. As shown here, the network management application 120 permits a programmer to generate a plurality of monitoring application programming interfaces (APIs) 160 that gather data associated with the different functions of the network device 155, such as statistics associated with the network device 155, routing tables, status of the device 155, topology information, errors, and the like. Moreover, APIs 160 may also permit a programmer or network administrator to control the functions of the network device 155 such as change settings in the forwarding engine, change the state of the device 155, etc.

In one embodiment, the network management application 120 may connect to a network device 155, identify the different interfaces in the network device, and configure an API 160 for each interface. By abstracting the control plane of the network devices 155 using the APIs 160, the network management application 120 may permit the network administrator to monitor and control a plurality of different types of network devices 155 that each may use proprietary firmware. One such product that permits this function is the One Platform software development kit (SDK) by Cisco® (a registered trademark in the United Stated many other jurisdictions).

Using the network management application 120, the user application 125 may configure the APIs 160 on the network devices to perform certain functions. For example, user application 125 may use APIs 160 to receive data such as statistics, the current state of the network device 155, or, routing information. The user application 125 may use this gathered information to, for example, to identify network flows associated with a particular client ID. Because the network management application 120 customizes the monitoring APIs 160 based on the underlying firmware and hardware configuration of the respective network devices 155, the user application 125 can receive the same data from all the network devices 155 in the SDN enabled network 150.

Additionally, user application 125 may use APIs 160 to carry out commands sent to the network devices 155. For example, user application 125 may configure a setting of a firewall on a plurality of network devices 155. The user application 125 may transmit the same instruction to each of the network devices 155 which the respective APIs 160 then convert into instructions based on the specific firmware of the network devices 155.

As shown, user application 125 includes an identify sniffer 130, location finder 135, and resource manager 140. The identity sniffer 130 may be used to recognize a client's identity (i.e., a client ID) based on the data provided by the monitoring APIs 160. The "client ID" is used herein to distinguish between one client (or a group of clients that share a common attribute) from other clients who access the SDN enabled network 150. For example, by monitoring the network flow in network device 155, identity sniffer 130 may detect a certain login information that the client uses when accessing a 802.1X wireless LAN. Each time the client uses the 802.1X login information, the identify sniffer 130 can correlate the login information to the client ID representing the client. Additionally, the type of network flow reported by the APIs 160 may enable the identify sniffer 130 to infer a client ID. For example, the identity sniffer 130 may determine that a particular network flow as being associated with high-velocity trading. Thus, the user application 125 can associate the high-velocity trading network flow with the client ID that represents stock brokers.

Location finder 135 may be used to determine a geographic location of a client. That is, when the client ID is assigned to a network flow, the location finder 135 determines the current location of the client generating the network flow. In one embodiment, location finder 135 may set an event filter based on the client ID detected by the identity sniffer 130. The event filter may detect when the client changes geographic position based on identifying the client ID using different network flows in the SDN enabled network 150. That is, the location finder 135 may track the client as the different network flows contain identification data that maps to the client ID. These flows may include login information provided to authenticate the client, an IP address, MAC address, etc. When this identification data is transmitted on the SDN enabled network 150, the filters may capture and transmit this information to the location finder 135 which can identify a current geographic location of the client based on the network flow containing the identification data. Location finder 135 may, for example, use the APIs 160 to discover the network topology and determine the network device 155 currently being used by the client. The location finder 135 may link the client's geographic location to the location of the network device 155.

The resource manager 140 may reallocate resources based on the geographic movements of the client. In one embodiment, the user application 125 may be a content distribution network (CDN) that uses the information provided by the APIs 160 to cache content typically requested by the client in a storage element proximate to the client's current location. Because the CDN can begin to cache data as soon as the location finder 135 identifies the current location of the client, the resource manager 140 can cache data proximate to the client even before the client actually transmits a request for data from the CDN. In addition to caching data, the resource manager 140 may be configured to allocate other resources such as storage space or virtual resources associated with the client. For example, if the client typically uses a virtual desktop service for work, as the client travels, the resource manager 140 may instruct a server of the desktop service proximate to the client to set aside resources for providing the virtual desktop to the client. Doing so may reduce latency between the desktop service and the client as well as enable the resource manager 140 to load balance between different servers.

In one embodiment, the SDN enabled network 150 includes network devices 155 whose controls planes are abstracted such that the control planes may be controlled by software applications (e.g., user application 125). Network 150 may be only a portion of a larger network (e.g., the Internet) which includes other SDN enabled networks or non-SDN enabled networks. The network devices 155 may be any type of network elements such as routers, switches, bridges, and the like. The network devices 155 may be sold by different vendors, and thus, may use different proprietary firmware for configuring the control plane. However, as discussed above, each network device 155 may include one or more monitoring APIs 160 that exposes the various functions of device 155 to user applications. In one embodiment, the user application 125 may configure the monitoring APIs 160 to suit the particular needs of the user application 125. In other embodiments, however, the APIs 160 may already be configured by the network management application 120. The user application 125 may then use the preconfigured APIs 160 to monitor the functions of the network device 155 as well as transmit instructions to the network device 155 to reconfigures the settings of the device 155.

Figure 2:
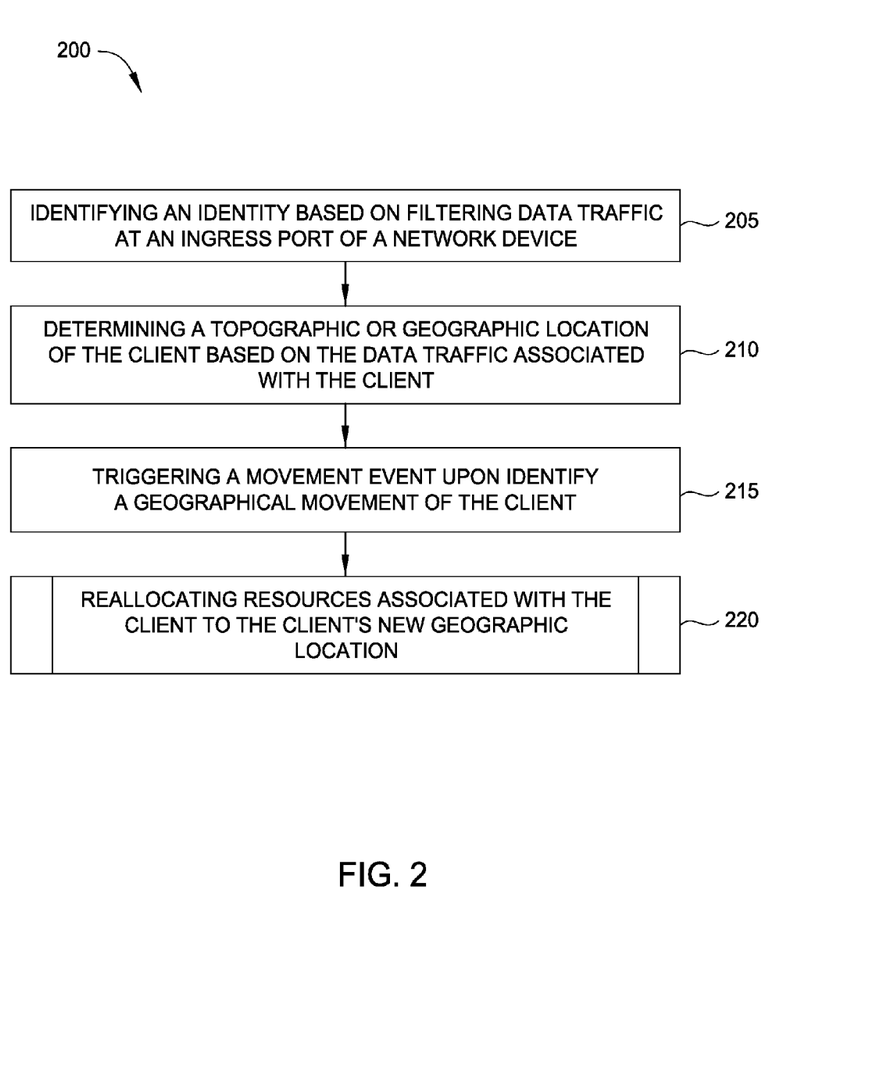
FIG. 2 illustrates a method for allocating resources by monitoring a client's geographic movements, according to one embodiment disclosed herein.

FIG. 2 illustrates a method 200 for allocating resources by monitoring a client's geographic movements, according to one embodiment. At block 205, the identity sniffer may identify a client ID based on filtering data traffic at an ingress port of a SDN enabled network device. The identity sniffer may install an input filter on the ingress ports of, for example, one or more switches or routers in the SDN enabled network. In one embodiment, the identity sniffer may selectively install the input filter only on certain network devices in the network (e.g., edge devices). In one embodiment, the input filter may use the monitoring APIs established by the network management application to monitor the data flowing through the ingress ports.

The input filter may evaluate received packets to detect information that enables the identity sniffer to assign a network flow to a particular client ID. For example, the identity sniffer may configure the input filter to look for packets that contain IEEE 802.1X authentication information, mail connections (SMTP, POP, IMAP, or Activesync traffic), VPN connections, DHCP discover and registration packets, lightweight directory access protocol (LDAP) database information, and the like. For example, the input filter may be executed on a wireless router that uses the mechanisms of IEEE 802.1X to authenticate users. Or the input filter may be on an edge device that is able to monitor VPN traffic and identify a client's originating IP. That is, even though a client's originating IP address may be masked when using a VPN, the input filter is able to identify the originating IP address. For example, a client may be physically located in New York but access a VPN whose servers are located in California. When requesting content from a CDN, the CDN may mistake the IP address assigned by the VPN as the originating IP and thus begin caching content in California when the client is actually in New York. The input filter, in contrast, may use the monitoring APIs to correctly ascertain the originating IP, and thus, determine the correct client ID for the client.

In another example, a LDAP database or Active directory can be consulted to correlate any of the information gathered using the techniques described above to a client ID. These sources may contain entries that list a set of attributes such as a name, telephone number, email address, job description, and the like. The identity sniffer may use, for example, an email address or MAC address retrieved by an input filter to parse through an LDAP database to develop a client ID associated with the network flow.

In one embodiment, the identity sniffer may distinguish between multiple clients who have the same IP address or use the same computing device. For example, a residential wireless router may assign the same IP address to all outbound traffic even if that traffic originates from different clients. An input filter on a network device connected to the residential router may determine that the network traffic from the router includes multiple different MAC addresses. The identify sniffer may then assign two different client IDs to the network traffic flowing from the router based on the MAC addresses. Further still, even if two clients use the same device (and thus have the same MAC address), the input filter may use information such as SMTP or POP traffic when the clients access respective email accounts to differentiate between the clients.

In one embodiment, the client ID may not be directly tied to a specific, human client. Instead, the identity sniffer may use the input filter to assign a network flow to a client ID based on a characterization of the client. For example, the client ID may be a specific job or rank within an organization. Thus, multiple clients may be associated with the same client ID. In one example, a single client ID may represent all the network administrators in a corporation. Here, the input filter may use an 802.1X authentication message that has a username "admin" to identify network flows associated with the "network administrator" client ID. Several people within an entity may be grouped into this client ID; nonetheless, the user application may distinguish these individuals from other users in the corporation and reallocate resources accordingly. In another example, the user application may use the same client ID to represent all the division heads in a corporation. The division heads may use a separate, more secure, server for hosting their virtual desktop connections. When an input filter identifies a network flow with packets destined to this server, the identity sniffer may associate the network flow with the client ID, regardless of which division head is actually generating the network flow. In this manner, the identity sniffer may guess an identity of the person based on attributes of the network flow without ever positively identifying the clients individually (e.g., a group of clients may be distinguished from other clients based on shared or common attributes).

The identity sniffer may maintain a list of client IDs. These IDs may be predefined entries (e.g., a client ID for representing all the division heads in the corporation) or entries added based on identities found by, for example, querying a LDAP database to retrieve a specific name of a client. Moreover, the identity sniffer may store criteria for determining when a client ID can be associated with a particular network flow. For example, if multiple clients may use the same device (and therefore generate network flows having the same MAC address), the criteria may stipulate that a network flow must include a 802.1X authentication message or a mail connection that includes a user name before the network flow containing the identification data can be associated with a client ID of a specific person. Alternatively, if the client ID is for a group of people (e.g., a household), identifying a MAC address may be enough to associate a particular network flow with the client ID representing the group.

Advantageously, using the input filter and the monitoring APIs to evaluate received packets allows the identity sniffer to access data that the user application could not access from a non-SDN enabled network. For example, to monitor the traffic on an ingress port without the APIs, a system administrator would need to use a plurality of command-line interface (CLI) commands or a script for retrieving the data using the firmware of the network device. This process may have to be repeated for each network device the network administrator wishes to monitor. Moreover, the scripts may have to be updated as the firmware on the network devices is upgraded. Instead, using the abstraction layer provided by the APIs, a programmer can generate a single input filter that may be compatible with any type of network device in the SDN enabled network.

At block 210, the location finder may determine a topographic location or a geographic location of the client (or both) based on the data traffic associated with the client. In one embodiment, the location finder may set an application event filter based on the client ID found by the identify sniffer. Once the identity sniffer identifies a client ID, this triggers the application event filter to then identify a geographic or topographic location of the client. That is, the input filters controlled by the identity sniffer may constantly be filtering data flowing into one or more network devices looking for identification data. If the identity sniffer is able to associate a client ID with a network flow, the network flow and/or client ID is provided to the application event filter to determine a location of the client.

Although the present embodiments focus on identifying a geographic location of the client—e.g., a street address, a geographic region (a zip code, border of a country, or coverage area of a mobile phone tower), latitude/longitude, etc.— in some embodiments, identifying the client in relation to a network topography may be sufficient. For example, to identify the best storage element to cache data for a client, the user application may evaluate the network hops or the latency time between the network device to which the client is connected and a plurality of candidate storage elements. The geographic distance between the client and the storage elements may not need to be considered. Thus, instead of identifying the geographic location of the client, the location finder may determine the client's location in the network topology.

To identify the client's location, the location finder may evaluate the network flow used to identify the client ID. For example, if an 801.2X authentication message was used to detect the client, the location finder may retrieve the physical location of the wireless LAN access point which received the authentication message. Specifically, the location finder may maintain a list or directory that contains the different geographic locations of the network devices in the SDN enabled network. If the identity sniffer determined the client ID using an IP address (VPN or otherwise) or mail connection, the location finder may use GeoIP lookup to determine the client's location. If the client ID was identified using DHCP discovery and registration packets, the location finder may use a segment location.

At block 215, the location finder may determine, based on the geographic location, whether the client has moved. In one embodiment, the location finder may maintain a database or table with the current geographic location of each client ID found by the identity sniffer. If the client has moved, the location finder may trigger a movement event for instructing the user application to reallocate resources associated with the client ID. For example, the identity sniffer and location finder may have previously determined that a client established an email connection using a computer at work. Later, the identity sniffer may identity a network flow that contains an 802.1X authentication message with credentials that match the client ID. Because the client changed geographic locations, the location finder may trigger a movement event thereby instructing the user application to reallocate resources based on the new geographic location of the client.

In one embodiment, the location finder may include criteria for determining when identifying a network flow triggers a movement event. The location finder may not trigger a movement event if the client merely switches to a different computing device but stays at the same location (e.g., the client switches from a mobile phone to a desktop computer) or connects to a different network device that is within a predefined radius of the previous network device that detected the client's network flow. For example, the location finder may have a predefined map of the different geographic locations or regions. The location finder may trigger a movement event only if the client connects to a network device in a different region. Movement between network devices within a particular region may be ignored.

In one embodiment, the location finder may trigger a movement event when the network flow stops. That is, the location finder may infer, based on the network flow ceasing, that the client has moved from her current geographic location. For example, DHCP typically requires a device to periodically renew its IP address. If the client has, e.g., shutdown her computer, the DHCP traffic will stop. The input filter monitoring the DHCP traffic may then report to the identity sniffer and the location finder that the DHCP traffic stopped. If no other network flow can be associated to the client ID, the location finder may remove the geographic location currently associated with the client ID. This removal may trigger a movement event that results in the user application reallocating resource associated with the client ID. Thus, the user application may trigger a movement event based on the client leaving the current location even if the new geographic location is not yet known.

If the client ID represents a group of individuals with a shared attribute or attributes, the location finder may store a plurality of geographic locations. For example, three different division heads may be currently working in the network and generating three different network flows at three different geographic locations. Nonetheless, the division heads may be associated with the same client ID. If one of the network flows stops or another network flow is associated to the client ID, the location finder may trigger a movement event which may reallocate resources.

In one embodiment, the location finder may trigger the movement event only if the network flow is determined to be in specific geographic locations. For example, if the location finder determines that a division head has traveled to a foreign country, the location finder does not trigger a movement event. For security resources, the user application may not want to reallocate resources onto network devices in the particular foreign country. However, in other embodiments, the resource manager instead of the location finder may determine whether to reallocate resources.

At block 220, the resource manager may reallocate resources based on the location finder triggering a movement event. Specifically, the resource manager may bring resources associated with the client ID proximate to the client. When determining how to reallocate resources, the resource manager may consider the physical distance between the client's location and the location of the resource, or the network hops/latency separating the client and the resource (or both). For example, the resource manager may cache client contact on a storage element that is physically closest to the network device used by the client to access the SDN enabled network. Or the resource manager may identify all storage elements that are in the same geographic region as the client and choose the storage element with the least latency path to the client or choose the storage element that is the least utilized (i.e., perform load balancing).

The resource manager may cache at the selected storage element web cache data, files, media data, and the like. In one embodiment, the resource manager may cache the data before the client requests data from the user application. If the user application is a CDN, unlike typical CDNs, the user application can begin to cache data once the client's location is identified rather than waiting for the client to transmit a request for content from the CDN.

In addition to caching data, the resource manager may use a monitoring API executing on a local storage-area network (SAN) in the SDN enabled network to provide a local network-attached disk for the client. The resource manager may then replicate data from existing locations to the new partition on the local SAN proximate to the client. For example, the resource manager may copy data from a SAN proximate to the client's previous location into the local SAN. This frees resources at the previous SAN that can be used for other clients.

In another embodiment, the resource manager may re-route network flows to be closer to the client. For example, after establishing a partition for the client in a local SAN, the resource manager may change the mapping of a network drive associated with the client to point to the local partition. The resource manager may use the APIs in the network devices to update their controls planes to route the data from the current location of the client directly to the local partition. The network flows used by other clients to store or retrieve data from the network drive may remain unchanged.

Additionally, the resource manager may allocate local computer resources for the client. Virtual machines and other services may be transferred to hardware resource proximate to the client. For example, if the user application controls a virtual desktop infrastructure, the resource manager may instruct a server proximate to the client to initiate a virtual desktop environment for the client. Thus, before the client even attempts to access the virtual desktop, the resource manager may have allocated dedicated resources on a local server for the client which are ready to service the client. In this embodiment, the resource manager allocates resources that may be outside of the SDN enabled network. That is, the servers of the virtual desktop environment may coupled to the SDN enable network but may not be controlled by a SDN controller. Accordingly, the present embodiments are not limited to allocating only resources provided by the SDN enabled network (e.g., network storage, caching, or altering network flows) but may also use the information gathered by the SDN enabled network to allocate resources outside of the network.

The previous example are intended as non-limiting examples of different resources that can be allocated based on identifying clients and transferring the resources associated with the client based on the client's geographic movements. One of ordinary skill in the art will recognize the variety or different ways the information gathered from monitoring network flows and assigning client IDs may be used to reallocate resources associated with a single client or a group of clients.

Figure 3A:
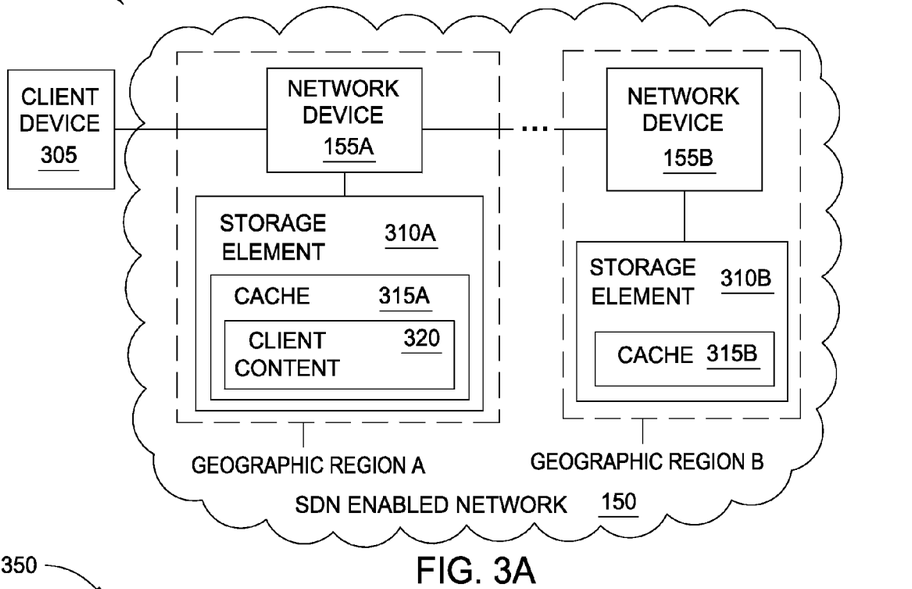
FIGS. 3A-3B illustrate systems for caching data based on monitoring a client's geographic movements, according to one embodiment disclosed herein.
Figure 3B:
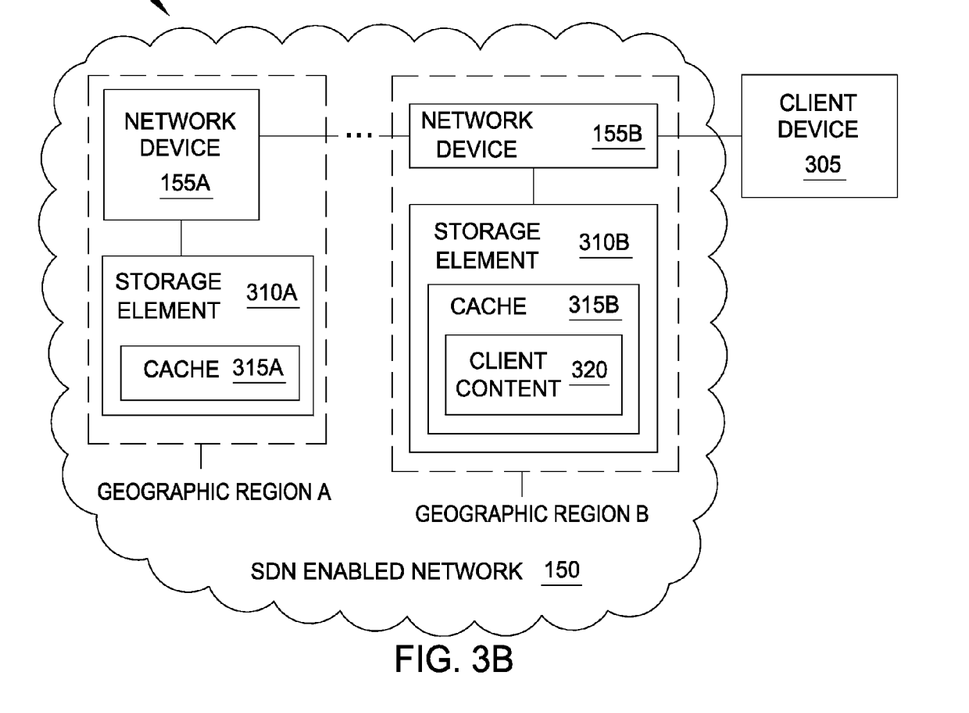

FIGS. 3A-3B illustrate systems for caching data based on monitoring a client's geographic movements, according to one embodiment disclosed herein. As shown, FIG. 3A illustrates a system 300 where client device 305 uses network device 155A to access the SDN enabled network 150. Here, system 300 uses cache 315A of storage element 310A to cache the client content 320. For example, storage elements 310A-B may be part of a CDN which is configured to store and cache client content 320 associated with the client (not shown). Because the client is currently in geographic region A, the CDN caches the client content 120 at the storage element in the same region as the client—e.g., storage element 310A.

As shown in system 350 of FIG. 3B, the client device 305 has moved to geographic region B. The CDN may include an identity sniffer that detects the client's ID once the client device 305 connects to network device 155B. Specifically, the identity sniffer may place an input filter at the ingress port of network device 155B that detects any of the identification data discussed at block 205 of method 200. Once the client ID is identified, the CDN may use a location finder to determine that the current location of the client—e.g., geographic region B. Based on this knowledge, the CDN transfers the client content 320 to the storage element 310B proximate to the client's new location. Note that this transfer may be done on a per-client basis. That is, client content associated with other clients may remain unchanged. Moreover, the CDN may transfer the content 320 before the client initiates another request for content (e.g., before the client requests a cached webpage, data file, media file, etc. from the CDN).

The technique shown in FIGS. 3A and 3B may be adapted for allocating other resources such as changing network flows, creating local partitions for network storage, and the like.

Figure 4:
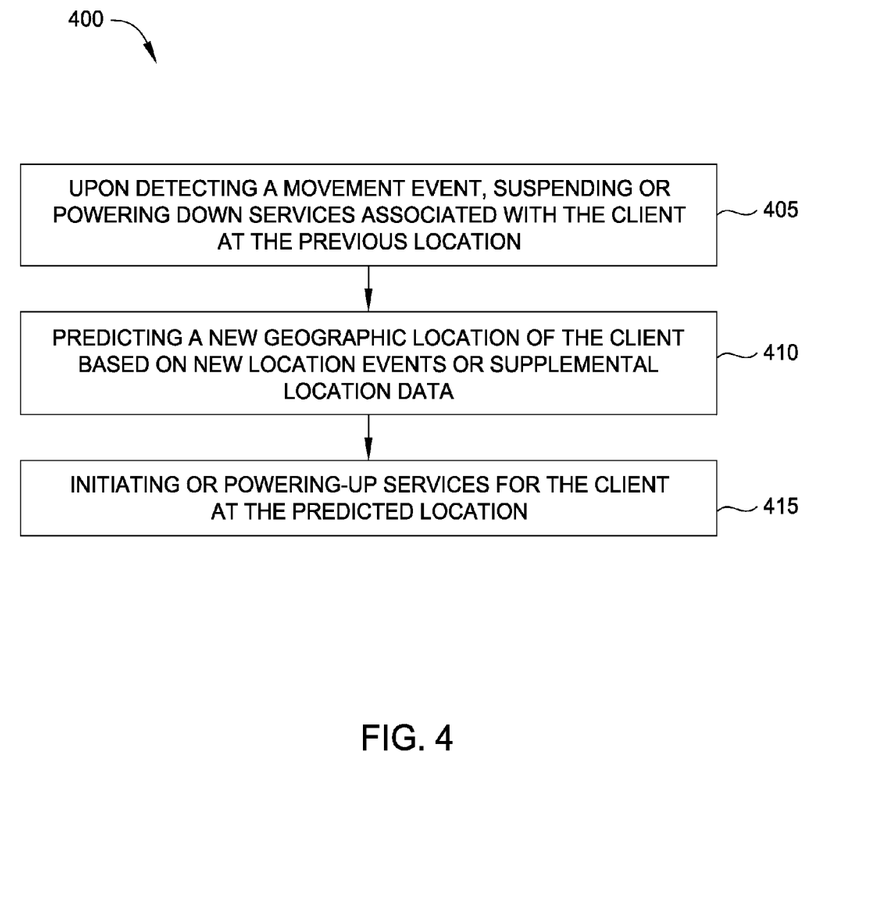
FIG. 4 illustrates a method for predicting a geographic location to allocate resources based on movement events, according to one embodiment disclosed herein.

FIG. 4 illustrates a method 400 for predicting a geographic location to allocate resources based on movement events, according to one embodiment. Specifically, method 400 Illustrates an example of blocks performed as part of block 220 of FIG. 2. In this embodiment, the user application may determine and evaluate client movement events to reallocate resources to the client's future or predicted location. At block 405, upon detecting a movement event, the resource manager may suspend or power down services associated with the client at the previous location. As discussed above, if the network flow associated with the client ID stops—e.g., the client device no longer issues DHCP instructions to renew an IP address—the location finder may trigger a movement event. From this, the resource manager may assume that the client has moved from the current location. In response, the resource manager may, for example, move cached client content from local storage elements, deallocate the client's local partition, or re-route network flows back to default configurations. For example, if the resource manager had reserved processing resources for the client at a local server, the manager may remove the reservation so that the processing resources may be used by a different client.

Alternatively, the resource manager may suspend or power down the local resources upon identifying a new geographic location of the client. If a client has stopped a network flow but has not yet left the geographic location, then deallocating resource before ensuring that the client has left the location may waste time and computer resources. The resource manager may have to reallocate the resources if the client restarts the network flow. Thus, in this example, the resource manager may first identify the new location of the client before deallocating resources at the previous location. In another embodiment, the resource manager may deallocate some resources when the identity sniffer determines that the network flow has stopped (e.g., the manager may stop caching client contact proximate to the client) and deallocate the rest of the resources when the location finder confirms that the client has moved to a different geographic location (e.g., the manager may remove a local partition associated with the client).

At block 410, the resource manager may predict a new geographic location of the client based on new location events or supplemental location data. In one embodiment, the resource manager may determine that the current geographic location of the client is a transient location. For example, the identify sniffer may detect a network flow associated with the client ID in a network device associated with a mobile phone tower. The resource manager may assume, based on the function of the network device, that the current location is temporary (e.g., the client is likely to stay at the location for less than a predefined time period). Similarly, if the client accesses a wireless router at an entrance of a large plant, the resource manager may assume the location is only temporary given the location of the network device to which the client connected. In another embodiment, the resource manager may initially classify each location of the client as transient until the identity sniffer has determined that the network flow associated with the client ID continues for a predefined amount of time.

In one embodiment, the resource manager may use these transient locations to predict the ultimate destination of the client. For example, the resource manager may track the client as she passes through the coverage area of several mobile phone towers. The manager may then be able to determine a general direction the client is traveling. By using a historical list of previous locations visited by client, the resource manager may predict that the client is traveling to a destination she has visited previously. For example, the client may pass through the same mobile phone towers on her commute from home to work. Once the resource manager determines the client is heading in the direction of work, the manager may predict that is her ultimate destination.

In another embodiment, the resource manager may identify patterns based on the client's logged history. If, for example, the user application has previously determined that the client travels through region A, B, C before ultimately staying at region D for an extended period of time (e.g., regions A, B, and C may be three different mobile phone towers), the resource manager may predict that the client is traveling towards region D upon detecting network flows associated with the client in regions A, B, and C.

In one embodiment, the resource manager may access supplemental location data that originates outside of the SDN enabled network. For example, the user application may be linked to a client's calendar or day planner which may specify a future location the client may travel. These sources may also be used by the resource manager to predict a future location of the client. For example, the client may have an entry in the calendar stating she is traveling from New York to California on a certain date but may not specify a time. When at the airport, the client may log on to a network device that includes an input filter associated with the user application. Accordingly, the resource manager knows that the client is currently traveling, and using the supplement information data provided by the client's calendar, the resource manager can predict that the client is traveling to California.

At block 415, the resource manager may initiate or power-up services for the client at the predicted location. Here, the resource manager may perform all the different techniques for allocating resources that were discussed at block 220 of FIG. 2 but can perform these techniques without first determining that the client has arrived at the location where the resources are moved. For example, the resource manager may begin to cache content or assign local virtual resources to the client proximate to the client's predicted location. Thus, when the client arrives at the new geographic location, she can enjoy the benefits of having locally allocated resources even before the identity sniffer and the location finder of the user application determine that the client is at the predicted geographic location.

Figure 5A:
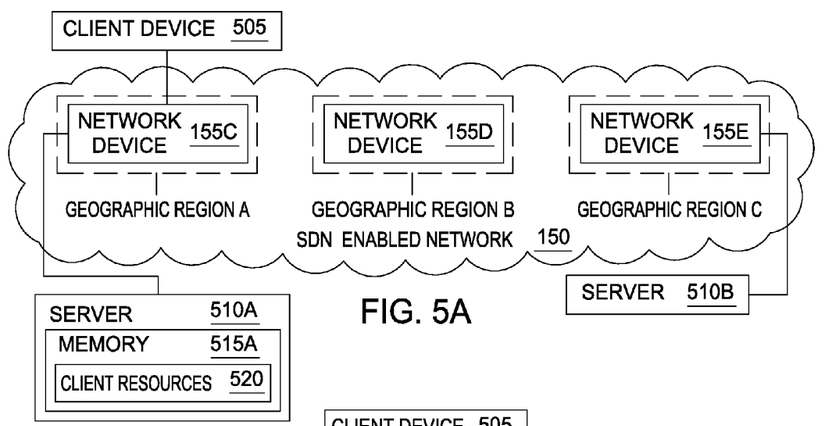
FIGS. 5A-5C illustrate systems for predicting a geographic location to allocate resources based on movement events, according to one embodiment disclosed herein.
Figure 5B:
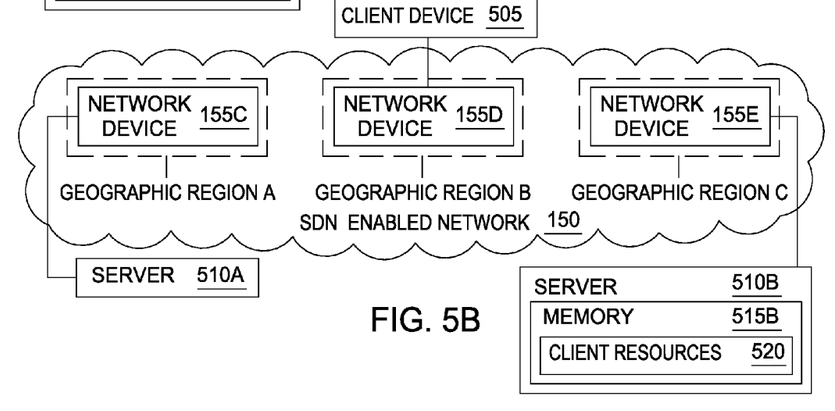
Figure 5C:
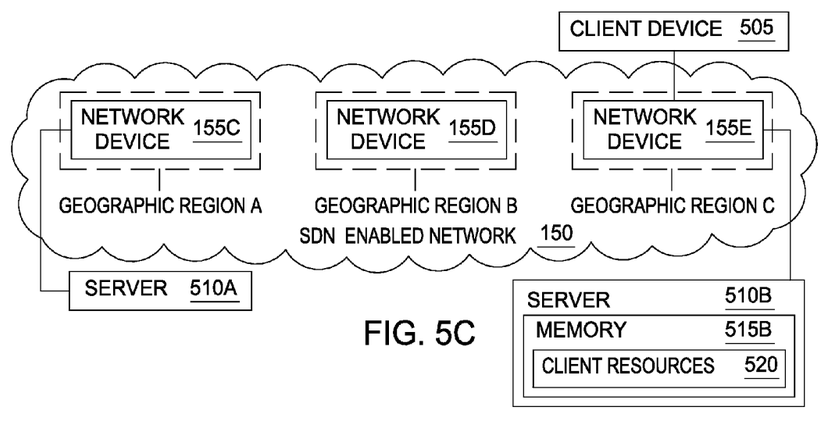

FIGS. 5A-5C illustrate systems for predicting a geographic location to allocate resources based on movement events, according to one embodiment disclosed herein. Specifically, FIG. 5A illustrates a system where the client device 505 is currently generating a network flow in network device 155C. In this example, assume that each network device 155C-E includes an input filter for identifying a data flow associated with the client. As shown, server 510A, which may be proximate to or within geographic region A, has allocated client resource 520 to the client. Here, the client resources 520 are shown as being part of memory 515A—e.g., a local partition mapping to the client's network drive. As discussed above, the user application may allocate other resources such a client cache, processing resources, a virtual desktop environment, etc.

In FIG. 5B, client device 505 is now generating a network flow on network device 155D. Because network device 155D is in geographic region B, the user application knows that the client has left geographic region A, and thus, the resources allocated to the client in that region (e.g., memory 515A) are deallocated. In one embodiment, however, the user application may begin to deallocate client resources 520 as soon as the network flow from client device 505 to network device 155C stops. Or the user application may deallocate some of the services provided to the client once the network flow stops but deallocate the rest of the services once the user applications detects that the client is now in geographic regions B.

In one embodiment, the user application may identify geographic region B as a transitory location of the client. This classification may be based on the type of network device 155D, the function of network device 155D, a usage-pattern associated with the client, the time the client spends in geographic region B, and the like. Nonetheless, based on the client generating a network flow on network device 155D, the user application may predict the client's ultimate destination—geographic region C. As discussed above, the user application may use geographic regions A and B to identify a direction which may correspond to geographic region C. Additionally or alternatively, the user application may rely on a client's history to see if the client has previously stayed at any locations within the direction for a predefined period of time. If so, the user application may begin to allocate resources associated with the client to that geographic region. In another embodiment, the user application may have identified a pattern based on previous movements of the client. For example, when the client moves from geographic region A to geographic region B, she is most likely to stay in geographic region C for an extended period of time. As shown here, the client resources 520 previously stored on server 510A are now provided to the client via server 510B.

FIG. 5C illustrates the client using client device 505 to generate a network flow on network device 155E. As shown, client resources 520 are locally available to the client immediately, without the user application having to determine whether the client is actually located in geographic region C. Because it may take several minutes to reallocate resources, by predicting a future location of the client using the SDN network, the user application may reduce the latency for accessing the resources relative to loading the resource upon detecting the client ID.

In one embodiment, the user application may allocate only some of the resources associated with the client at a predicted geographic location but then allocate additional resources once the user application confirms that the client has arrived at the location. For example, the user application may assign a strength-of-prediction score to the predicted geographic location. The user application may reallocate resources to the predicted location based on the score. If the score is high, the user application may reallocate a plurality of resources to the predicted location (e.g., the application may move the client's cache to a local storage element as well a re-route network flows to network device 155E), but if the score is low, the user application may reallocate only a select amount of the client's resource to local computing devices (e.g., the application may move only the client's cache to a local storage element but not generate a local partition, or the application may re-route one of the network routes used by the client but not others). In this manner, the user application may attempt to mitigate a potential waste of resources if the user application incorrectly predicts the client's ultimate destination.

As will be appreciated by one skilled in the art, embodiments may be embodied as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

CONCLUSION

In one embodiment, the flexibility of SDN may be used to track the geographic movements of a client and reallocate resources based on these movements. Using APIs on network devices in a SDN enabled network, an application may monitor the network traffic flowing through the network devices to determine an identity of the client initiating the network traffic. Specifically, the APIs provide the user application with client credentials, IP addresses, MAC addresses, and other identifying information mined from the network flows. Once the identity is found, the application may identify the client's current geographic location.

The network devices may continue to monitor the network devices to identify any movement events such as the client disconnecting from a network device (e.g., turning off a computing device), timing out of a wireless connection, detecting that the client has connected to a different network device, and the like. Upon detecting the movement event, the application may begin to reallocate resources based on the new geographic location of the client. For example, the application may cache data at a storage element in close proximity to the client, start-up resources for the client at a local server, log the client into a computing device at the new location, and the like. Accordingly, in contrast to typical CDNs that reallocate resources after a client requests data, the application can reallocate resources by monitoring the client's movements.

Because the user application assigns a client ID based on a client's traits or attributes (e.g., a username, job title, type of data the client generates, etc.), the application can track a client even if that client switches between different computing devices, e.g., a desktop computer and a mobile phone. For example, the network devices in the SDN may inform the application that the client has left work (e.g., the client is no longer sending data traffic to an edge device using her desktop computer). However, another network router may identify the client when the client's mobile phone initiates a wireless connection. The application can then reallocate resources associated with the client base on her new location. Accordingly, the application may track a client based on a client ID rather than monitoring a particular device.

In one embodiment, the application may predict a geographic location of the client based on one or more movement events. The application may develop user patterns which are triggered based on the movement events. For example, a client may log out of a work computer and then commute either to her home or to the gym. Assuming these two paths take the client through different mobile phone towers, as the client's mobile phone connects to the network devices in these towers, the application may predict the client's ultimate destination (e.g., home or the gym) and reallocate resources accordingly.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for allocating resources based on geographic movement of a client, the method comprising:
   determining a first geographic location of the client;
   receiving identification data for identifying the client from at least one application programming interfaces (API) operating in a network device in a software-defined networking (SDN) enabled network, wherein the API identifies the identification data by filtering a network flow traversing an ingress port of the network device;
   associating the network flow to a client ID using the identification data;
   determining, based on the network flow, a second geographic location of the client, wherein the first and second geographic locations are different; and
   allocating computing resources associated with the client ID in response to the client moving from the first geographic location to the second geographic location.

2. The method of claim 1, further comprising:
   configuring an input filter on the network device for filtering the network flow using the API, the API abstracting a control plane of the network device to permit a remote user application to monitor and control data traffic traversing the network device, wherein the filtered data comprises predefined types of data that enable identification of the client ID.

3. The method of claim 2, wherein a plurality of network devices in the SDN enabled network each comprise a respective input filter and a respective monitoring API for monitoring data traffic traversing the plurality of network devices for detecting the identification data.

4. The method of claim 1, wherein the client ID represents a human client, wherein the identification data describes an attribute of the human client.

5. The method of claim 1, wherein allocating resources associated with the client ID further comprises determining local resources proximate to the second geographic location, wherein the local resources provide at least one of a cached content associated with the client, a storage partition associated with the client, re-routing network traffic associated with the client ID, and a network service associated with the client.

6. The method of claim 1, wherein allocating resources associated with the client ID further comprises:
   predicting a future geographic location of the client based on the first and second geographic locations; and
   reallocating resources associated with the client proximate to the future geographic location before confirming that the client has moved to the future geographic location.

7. The method of claim 1, further comprising:
   detecting that the network flow containing the identification data has stopped; and
   before determining that the client has moved into another geographic location, deallocating resources associated with the client in the second geographic location, wherein deallocating resources comprises at least one of removing a local content cache associated with the client ID, freeing a local storage partition associated with the client ID, re-routing network traffic associated with the client ID, and discontinuing a network service associated with the client ID.

8. A computer program product for allocating resources based on geographic movements of a client, the computer program product comprising:
   computer code that determines a first geographic location of the client;
   computer code that receives identification data for identifying the client from at least one application programming interfaces (API) operating in a network device in a software-defined networking (SDN) enabled network, wherein the API identifies the identification data by filtering a network flow traversing an ingress port of the network device;
   computer code that associates the network flow to a client ID using the identification data;
   computer code that determines, based on the network, a second geographic location of the client, wherein the first and second geographic locations are different;
   computer code that allocates computing resources associated with the client ID in response to the client moving from the first geographic location to the second geographic location; and
   a non-transitory computer-readable storage medium containing the computer code.

9. The computer program product of claim 8, wherein monitoring the network flow comprises:
   computer code that executes an input filter on the network device for monitoring the network flow using the API, the API abstracting a control plane of the network device to permit a remote user application to monitor and control data traffic traversing the network device.

10. The computer program product of claim 9, wherein a plurality of network devices in the SDN enabled network each comprise a respective input filter and a respective monitoring API for monitoring data traffic traversing the plurality of network devices for detecting the identification data.

11. The computer program product of claim 8, wherein the client ID represents a human client, wherein the identification data describes an attribute of the human client.

12. The computer program product of claim 8, wherein allocating resources associated with the client ID further comprises determining local resources proximate to the second geographic location, wherein the local resources provide at least one of a cache of content associated with the client, a storage partition associated with the client, re-routing network traffic associated with the client ID, and a network service associated with the client.

13. The computer program product of claim 8, wherein allocating resources associated with the client ID further comprises:
   computer code that predicts a future geographic location of the client based on the first and second geographic locations; and
   computer code that reallocates resources associated with the client proximate to the future geographic location before confirming that the client has moved to the future geographic location.

14. The computer program product of claim 8, further comprising:
   computer code that detects that the network flow containing the identification data has stopped; and
   computer code that, before determining that the client has moved into another geographic location, deallocates resources associated with the client in the second geographic location, wherein deallocating resources comprises at least one of removing a local content cache associated with the client ID, freeing a local storage partition associated with the client ID, re-routing network traffic associated with the client ID, and discontinuing a network service associated with the client ID.

15. A system comprising:
   a computer processor; and
   a memory containing a program that, when executed on the computer processor, performs an operation comprising:
      determining a first geographic location of the client;
      receiving identification data for identifying the client from at least one application programming interfaces (API) operating in a network device in a software-defined networking (SDN) enabled network, wherein the API identifies the identification data by filtering a network flow traversing an ingress port of the network device;
      associating the network flow to a client ID using the identification data;
      determining, based on the network flow, a second geographic location of the client, wherein the first and second geographic locations are different; and
      allocating computing resources associated with the client ID in response to the client moving from the first geographic location to the second geographic location.

16. The system of claim 15, wherein monitoring the network flow comprises:
   executing an input filter on the network device for monitoring the network flow using the API, the API abstracting a control plane of the network device to permit a remote user application to monitor and control data traffic traversing the network device.

17. The system of claim 16, wherein a plurality of network devices in the SDN enabled network each comprise a respective input filter and a respective monitoring API for monitoring data traffic traversing the plurality of network devices for detecting the identification data.

18. The system of claim 15, wherein the client ID represents a human client, wherein the identification data describes an attribute of the human client.

19. The system of claim 15, wherein allocating resources associated with the client ID further comprises determining local resources proximate to the second geographic location, wherein the local resources provide at least one of a cache of content associated with the client, a storage partition associated with the client, re-routing network traffic associated with the client ID, and a network service associated with the client.

20. The system of claim 15, wherein allocating resources associated with the client ID further comprises:
   predicting a future geographic location of the client based on the first and second geographic locations; and
   reallocating resources associated with the client proximate to the future geographic location before confirming that the client has moved to the future geographic location.

* * * * *